United States Patent [19]

Kenigsberg et al.

[11] Patent Number: 5,156,780
[45] Date of Patent: Oct. 20, 1992

[54] PROCESS FOR TREATING A POROUS SUBSTRATE TO ACHIEVE IMPROVED WATER AND OIL REPELLENCY

[75] Inventors: Yitzchak Kenigsberg, Petah Tikvah; Ehud Shchori, Rehovot, both of Israel

[73] Assignee: Gelman Sciences Inc., Ann Arbor, Mich.

[21] Appl. No.: 554,263

[22] Filed: Jul. 18, 1990

Related U.S. Application Data

[63] Continuation-in-part of Ser. No. 384,585, Jul. 24, 1989, abandoned.

[51] Int. Cl.$^5$ .................. B05D 3/06; B05D 7/04; B29C 35/08; B29C 41/22
[52] U.S. Cl. .................. 264/22; 8/115.52; 8/115.64; 210/500.21; 210/506; 264/48; 427/508; 427/244; 427/513; 427/501; 427/496
[58] Field of Search .................. 264/22, 44, 45.1, 48, 264/41; 210/500.21, 506; 8/115.52, 115.53, 115.64; 427/44, 244

[56] References Cited

U.S. PATENT DOCUMENTS

| | | | |
|---|---|---|---|
| 3,277,039 | 10/1966 | Marascia et al. | 260/29.6 |
| 3,282,905 | 11/1966 | Fasick et al. | 260/89.5 |
| 3,491,169 | 1/1970 | Raynolds et al. | 260/900 |
| 3,617,355 | 11/1971 | Loffler et al. | 117/93.31 |
| 3,654,244 | 4/1972 | Pittman et al. | 260/79.7 |
| 3,660,360 | 5/1972 | Ray et al. | 260/78.5 E |
| 3,847,657 | 11/1974 | Rieber et al. | 117/135.5 |
| 3,854,871 | 12/1974 | Eanzel | 8/142 |
| 3,869,465 | 3/1975 | Waldmann | 260/29.6 F |
| 3,920,389 | 4/1975 | Eanzel | 8/142 |
| 3,940,359 | 2/1976 | Chambers | 260/29.6 F |
| 4,466,931 | 8/1984 | Tonny | 264/22 |
| 4,592,930 | 6/1986 | Schmidt et al. | 427/133 |

FOREIGN PATENT DOCUMENTS

| | | |
|---|---|---|
| 193370 | 3/1986 | European Pat. Off. |
| 216622 | 4/1987 | European Pat. Off. |
| 271054 | 6/1988 | European Pat. Off. |
| 287736 | 10/1988 | European Pat. Off. |
| 60-39482 | 3/1985 | Japan . |

OTHER PUBLICATIONS

Fluorinated Acrylic Polymers by: C. S. Sodano; Chem. Technology Review, No. 134.
The Structure and Wettability of Polymeric and Monolayer Surface By: R. E. Johnson, Jr. and R. H. Dettre; ACS Pol. Prep., Aug. 1987, vol. 28(2).

Primary Examiner—Leo B. Tentoni
Attorney, Agent, or Firm—Krass & Young

[57] ABSTRACT

Oil and water repellency is conferred upon porous substrates (10) by treatment with a solution of a monomer (16) of the formula: $(C_nE_{2n+1})(CH_2)_x(CHR)OCOCH=CH_2$ where n is an integer; X is 0, 1, 2 or 3 and R is H or $CH_2-OCOCH=CH_2$. The monomer is polymerized in situ upon the substrate to provide a conformal coating (16') which preserves the porous structure.

17 Claims, 1 Drawing Sheet

PROCESS FOR TREATING A POROUS SUBSTRATE TO ACHIEVE IMPROVED WATER AND OIL REPELLENCY

RELATED APPLICATION

This application is a continuation-in-part of U.S. application Ser. No. 07/384,585, filed Jul. 24, 1989, entitled "Process for Treating a Membrane to Achieve Improved Oil and Water Repellency", now abandoned.

FIELD OF THE INVENTION

This invention relates to water and oil repellent microporous substrates which maintain their water and oil repellency even after repeated washing or exposure to organic solvents. Specifically, the invention involves impregnating a microporous substrate with a solution of a fluorinated monomer in a carrier solvent, evaporating the solvent and polymerizing the monomer in situ to form a conformal, water and oil repellent coating which is mechanically adhered to the substrate.

BACKGROUND OF THE INVENTION

It is desirable in many situations to have porous materials that will repel water and oil, but at the same time allow the passage of air and other gases. This is particularly true in the case of microporous materials which are designed in many instances to allow the passage of a particular gas while preventing the passage of a broad spectrum of liquids. This repellency characteristic is often achieved by treating substrates such as paper, fabric or polymers, which have a porous structure with some type of chemical that will render them oil and/or water repellent. Ideally, the treatment should not close the pores of the substrate or otherwise restrict the flow of gases therethrough.

Repellency treatments are well known; however, prior art techniques often suffer from the disadvantage that repeated exposure to water or oil, such as by washing or dry cleaning, reduces the effectiveness of the treatment and the substrate eventually loses it water and oil repellency. As a result, it is frequently necessary to retreat substrates after washing or dry cleaning in order to maintain the desired repellency characteristics.

Use of fluorine containing polymers to provide water and oil repellency to textiles has been practiced for many years. Scotchguard ® sold by the 3-M Company and Zonyl ® sold by DuPont are examples of such treatments. The effectiveness of this treatment is reduced by dry cleaning with solvents such as Perchloroethylene or Freon ® and reapplication of the treatment is required after dry cleaning.

In some applications, methods and products have been developed for treating substrates such that the water and oil repellency characteristics of the substrate are allegedly maintained even after repeated washings or exposure to water and oil. For example, European patent application publication No. 0 193 370 A2 describes a particular group of fluorinated polyacrylates and polyacrylamides having a controlled degree of cross-linking and methods for preparing them. This publication discloses the use of a monomer of monoacrylate or monoacrylamide and a monomer of diacrylate or diacrylamide to prepare fluorinated polymers (column 1, lines 56-59; column 2, lines 1-10). Polymerization and cross-linking of the monomers is achieved by the application of ultraviolet radiation or electron beam radiation. (column 6, lines 40-43). The publication teaches that the treatment can be used on any substrate to provide water and oil repellency. (column 2, lines 61-65; column 3, lines 1-5; column 4, lines 3-5; column 5, lines 44-50). The application does not discuss the treatment in the context of a porous substrate in which the polymerization and cross-linking is achieved in situ on the surface of the substrate in a single step so as to form a conformal, mechanically adhered coating upon the substrate. Also, it should be noted that the particular materials described and claimed herein are not shown in the European application.

Japanese published application 60.39482 discloses a process for rendering textiles soil repellant through the use of a copolymer of a fluorinated and a non-fluorinated monomer. This application teaches that the use of a series of fluorinated monomers (which differ from those of the present invention) is responsible for making the textile oil repellent; and also, it emphasizes the necessity of using the non-fluorinated monomer to provide washability. The present invention employs different fluorinated monomers and does not require the use of the non-fluorinated monomer, yet provides greatly enhanced washing resistance. Yet another approach is disclosed in U.S. Pat. No. 3,847,657 which teaches a process for physically grafting a fluorinated monomer onto a polyester fiber through a free radical initiated process. This method, and the products thereof, are fundamentally different from those of the present invention.

Two types of wettability phenomena are of interest concerning the water and oil repellency of porous substrates. The first phenomenon relates to the tendency of the substrate to resist the transfer of liquid therethrough. This relationship is described by the following mathematical formula:

$$P = \frac{-4 \gamma \cos \theta}{D}$$

in which P is the breakthrough pressure required to force liquid through the substrate; gamma ($\gamma$) is the surface tension of the liquid; theta ($\theta$) is the contact angle formed between the liquid and a smooth surface of the solid material; and D is the effective pore diameter of the substrate. The contact angle ($\theta$) is dependent on the particular liquid and solid involved, and the surface tension ($\gamma$) is a characteristic of the liquid.

The purpose of treating the substrate is to increase its repellency by increasing the contact angle above 90°. According to the formula, a positive value for the applied pressure is possible only for negative values of the cos $\theta$. Thus only when the contact angle is greater than 90° is a positive breakthrough pressure required to force the liquid through the substrate. It should be appreciated that by treating the substrate, the contact angle will change because it is a unique function of a particular liquid that a particular surface, and the surface is changed by the treatment. In a hydrophobic porous substrate, the contact angle for water is greater than 90° and one has to apply a liquid pressure in order to overcome the resistance of the substrate to the transfer of water therethrough. At a contact angle less than 90° the substrate is intrinsically wetable and liquid will normally pass through in the absence of an externally applied force.

As mentioned above, the wetting or contact angle is also a function of the liquid involved. There is an empirical, almost linear relationship between cos θ and the surface tension of the liquid. The smaller the surface tension, the larger the cos θ becomes. (Reference: S. Wu in "Polymer Interface and Adhesion," Marcel Dekker 1982, p. 183). Most organic liquids have much lower surface tension (range of 18-40 dyne/cm) than that for water (72 dyne/cm) and are therefore more capable of wetting and penetrating porous substrates. The efficiency of an oil repellent treatment is therefore normally characterized by the lowest surface tension fluid which does not wet and penetrate the substrate. Solvents such as hexane (gamma=18 dyne/cm) are amongst the lowest surface tension fluids and the most challenging for those substrates.

It should be appreciated that the breakthrough pressure (P) is also inversely proportional to the pore diameter (D). Thus, microporous repellent substrates with pore diameters of 0.1 to 1 micron such as membranes and the like have breakthrough pressures ten or more times greater than substrates with pore sizes of 10 microns or more such as fabrics.

The second parameter relating to the repellency of a porous substrate involves the friction of the liquid as it moves across the substrate's surface. This parameter can be of critical importance especially in the case of a microporous membrane; because, even if a liquid does not pass through the membrane it can attach and coat the surface of the membrane such that air or gas permeability through the membrane is minimized. Ideally, a substrate should retain no liquid on its surface after exposure to the liquid.

The frictional force acting on a liquid to prevent movement across a substrate can be measured by a sliding drop test. In this test, a constant size drop (i.e., 50 ul or 25 ul) is placed on a substrate while it is in a horizontal position. The substrate is then tilted to the angle at which the drop first starts to move. This angle is called the sliding angle, and the smaller the sliding angle the greater the tendency of the liquid to drain from a surface after it is exposed to liquids. The sliding angle depends on the size of the drop. It becomes smaller as the drop becomes heavier. Surface morphology is also very important. Experience shows that the sliding angle becomes smaller with more open surface, provided the surface is hydrophobic enough. This was shown to be true with, for instance, microporous PTFE membranes. The higher nominal pore size PTFE membrane showed lower sliding angles. The same is also true with the treatment of this invention.

SUMMARY OF THE INVENTION

The present invention comprises a method for treating a porous substrate to achieve permanent water and oil repellency while maintaining the porosity thereof. The method includes the step of providing a fluoroacrylate monomer of the formula $(C_nF_{2n+1})(CH_2)_x(CHR)OCOCH=CH_2$ where n is an integer; X is 0,1,2 or 3 and R is: H or $CH_2OCOCH=CH_2$. The method includes the further steps of: disposing the monomer in a carrier vehicle so as to form a mixture thereof; impregnating the substrate with the monomer mixture; removing substantially all of the vehicle from the substrate and initiating polymerization of the monomer as for example by U.V. radiation or other such illumination or by electron beam irradiation. According to the method, the monomer is polymerized to form a conformal, oil and water repellent coating which is mechanically adhered to the substrate.

In particular embodiments of the invention, the monomer comprises a number of homologues corresponding to different values of n and at least 5% of the homologues have a value of n which is at least 8. In a further embodiment, at least 30% of the homologues have a value n which is at least 8. In yet another embodiment, at least 50% of the homologues have a value of n which is at least 8.

In a still further embodiment, the method includes the additional step of providing an initiator which is activatable to cause polymerization of the monomer and the additional step of activating the initiator as for example by light or heat. In yet other embodiments, a cross-linking reagent may be included with the monomer.

The present invention also includes an oil and water repellent substrate prepared according to the aforedescribed method. The substrate is characterized in that it is not wetted by solvents having a surface tension of 23 dynes/cm or greater and a sliding angle of less than 60° for a 50 micro liter drop of water.

DETAILED DESCRIPTION OF THE INVENTION

The present invention provides a treated, porous substrate which manifests permanent water and oil repellency. Generally, the substrate is treated by coating it with a mixture of fluoroacrylate monomer, which will be described in greater detail herein below, disposed in a carrier solvent. Coating may be accomplished, for example, by dip coating, spraying or similar processes well known to those of skill in the art. After coating, the carrier solvent is removed and the monomer is polymerized in situ to form a conformal coating on the substrate. When the monomer polymerizes, it mechanically adheres to the substrate thereby providing a coating which maintains the surface topology of the substrate and is not removed by washing or mechanical abrasion.

Substrates prepared according to the present invention can include: paper; woven, knitted and non-woven fabric; microporous synthetic membranes such as porous fluorocarbon membranes sold under the trade name Gore-Tex ® by the Gore Corporation; acrylic-/urethane microporous membranes as described in U.S. Pat. No. 4,466,931 and sold by Gelman Sciences, Inc. under the trade name Sunbeam Process ™; acrylic membranes such as those sold under the trade name Versapor ® by Gelman Sciences Inc.; aromatic polysulfone membranes sold under the trade name Supor ® by Gelman Sciences Inc., as well as other microporous membranes which are made of polyamides, PVDF, polyethylene, polypropylene, polyurethanes, vinyl and the like. Additionally, the treatment may be applied to natural microporous materials such as leather.

Figure 1A:
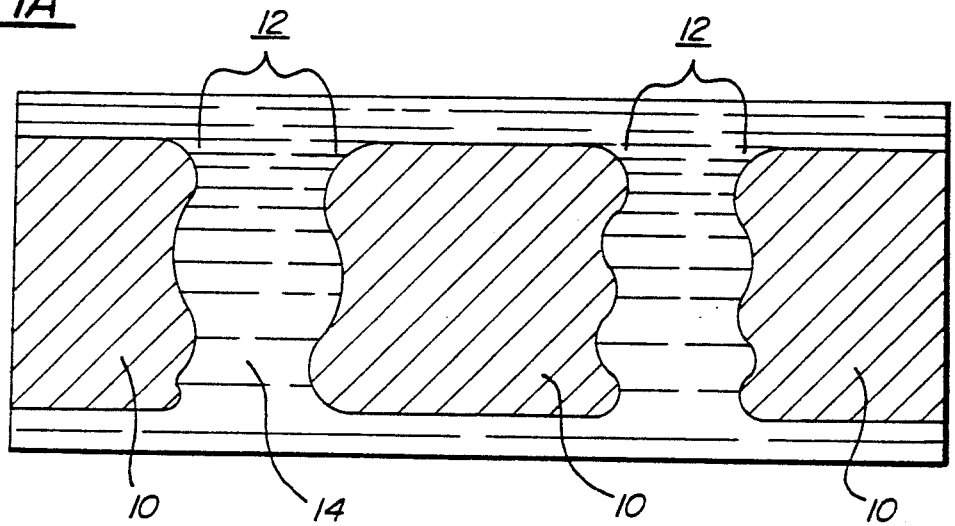
FIG. 1A is a schematic, cross-sectional view of a porous substrate, impregnated with a solution including a fluoroacrylate monomer in a carrier solvent.
Figure 1B:
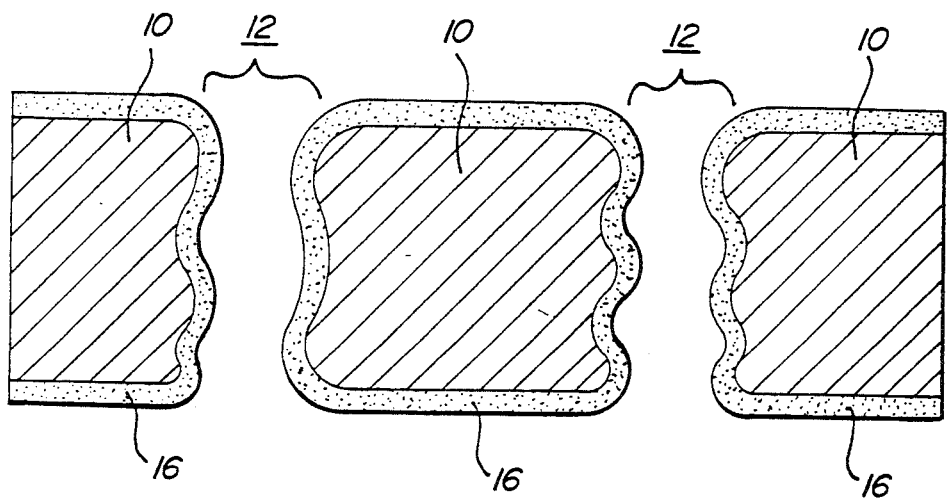
FIG. 1B is a depiction of the substrate of FIG. 1A, with the carrier solvent evaporated.
Figure 1C:
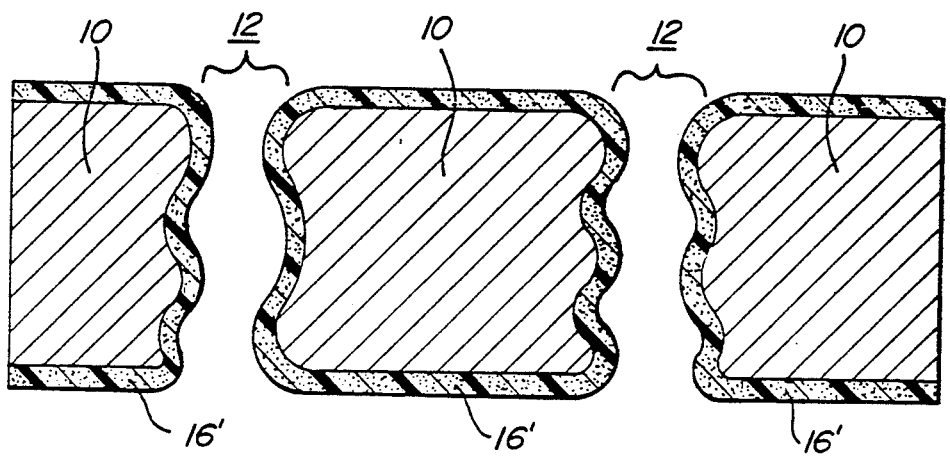
FIG. 1C is a depiction of the substrate of FIG. 1B after polymerization of the monomer.

FIGS. 1A-1C show, in somewhat schematic form, the coating of a typical porous substrate in accord with the present invention. FIG. 1A depicts a substrate 10, which is typically cloth, leather, paper, a microporous membrane or any other such substrate. As depicted, the substrate 10 includes a number of pores 12 passing therethrough. These pores 12 correspond to openings between strands of fiber, or actual passages through a membrane sheet and as depicted, the walls of the pore 12, are of somewhat irregular shape to indicate that the passages are typically convoluted. As further illustrated in FIG. 1A, the substrate 10 is saturated with a liquid solution 14 including at least a fluorinated monomer in an inert carrier solvent. As will be explained in greater detail hereinbelow, the solvent may comprise any one of a number of materials inert to the substrate 10 and the monomer, and the solution may be applied by a number of well known coating techniques.

In a subsequent step, as illustrated in FIG. 1B, the solvent is substantially evaporated form the substrate 10 leaving behind a conformal coating 16 thereupon comprised of the monomer. As used within the context of this application, a "conformal coating" is a coating which follows the general topology of the substrate, although it is to be understood that the coating can vary somewhat in thickness and need not reproduce the subjacent substrate geometry precisely. As illustrated in the figure, the conformal coating 16 covers both the surface of the substrate 10 as well as the walls of the pores 12. While the coating does narrow the pores 12 to some degree, it is notable that according to the present invention, the pores are not closed off by the coating. This feature of the present invention is particularly important in conjunction with the treatment of tight (i.e. pore size 0.2 micron or less) porous membranes, since anything which narrows the pore will effect a considerable increase in the flow characteristics of the membrane.

It should be noted that in FIG. 1B, the conformal coating 16 is illustrated as being on both surfaces of the substrate 10. It is to be understood that, in some instances, the solution may be applied so as to coat only one surface, or some other portion of the membrane; although, it is most typically preferred that the pores therethrough do have their interior surfaces coated.

In a subsequent step, the conformal coating of monomer is polymerized and FIG. 1C illustrates the membrane 10 having the conformal polymerized layer 16' thereupon. Polymerization of the monomer layer may be induced by the impingement of radiation, such as ultraviolet radiation, visible light or electron beam radiation thereupon. Also, polymerization may, in some instances, be carried out by chemical processes such as free radical initiated polymerization. The precise mode of carrying out the polymerization will depend upon the monomer as well as any other ancillary reactants included therewith. What is notable about the coated substrate 10 of FIG. 1C is the fact that the polymer coating 16' thereupon is conformal to the topology of the substrate. This conformal coating maintains the pore structure 12 of the substrate while still coating the interiors thereof. Since the coating is substantially continuous and since it extends through at least some of the pores of the substrate, it is thus interlocked mechanically onto the substrate. This feature represents an important aspect of the present invention. The mechanically interlocked coating is thus strongly retained upon the substrate and hence not removable by water or solvents utilized in cleaning processes or by mechanical abrasion, impact or other forces.

Since the substrate is effectively "cloaked" in the polymer coating, its surface properties can be changed very dramatically. For example, and as will be illustrated in examples which follow, the substrate may be made to be very highly hydrophobic and oleophobic while still retaining the physical and topological properties of the base material. This is an important distinction from prior art processes which, while operative to modify the gross surface properties of a material, frequently clog the pores thereof or otherwise destroy their topology.

In a typical prior art process, a porous substrate is treated with a solution of a polymerized material. Evaporation of the solvent leaves a residual coating upon the substrate; however, it has been found that evaporation effects resultant from solvent migration through the pores during evaporation, tend to transport and concentrate polymerized material at the openings of pores thereby severely narrowing these openings. The porous material coated by such processes have their pore structure destroyed or greatly diminished. Furthermore, polymeric materials placed upon substrates by such prior art solvent based processes are removed from the substrates with equal facility by the similar solvents. In contrast, coatings of the present invention are very resistant to being washed away by a large variety of solvents.

The present invention will be described more fully in terms of the various materials employed in the practice thereof and by the experimental results set forth hereinbelow.

The Monomer

The fluoroacrylate monomer used in the solution has the general structure of:

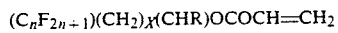

$(C_nF_{2n+1})(CH_2)_x(CHR)OCOCH=CH_2$ wherein n is an integer.; x is 0,1,2 or 3 and R is H or $CH_2OCOH=CH_2$. In the preferred embodiments, n has a value of at least 8 and is most preferably 8, 10 or 12. In many instances, the fluoroacrylate monomer is comprised of a mixture of homologues corresponding to different values of n. It has been found that for superior results at least 5% of the homologues should have a value of n which is 8 or more and most preferably at least 30% of the homologues should have a value of n which is 8 or more. Ideally, 50% of the homologue mixture should have a value of n of 8 or more.

Monomers of this type may be readily synthesized by one of skill in the chemical arts by applying well-known techniques. Additionally, many of these materials are commercially available. The DuPont Corporation sells a group of fluoroacrylate monomers under the trade name Zonyl ®. These materials are available with different distributions of homologues. As will be described in greater detail hereinbelow, those Zonyl° materials sold under the designation "TA-N" have particular utility in the practice of the instant invention.

The Solvent

There are a variety of solvents which may be employed to dissolve the monomer and aid in its deposition as a thin layer on the substrate. The solvents should not react with the monomer or substrate and should be fairly volatile to enable easy removal. There are a number of fluorocarbon solvents sold under the trade name of Freon ® by the DuPont Corporation and it has been found that the material designated Freon ® 113 is one preferred material. Other solvents such as chloroform, methylene chloride, perchloroethylene and other such halogenated solvents may be similarly employed as may be ketones such as acetone or methyl ethyl ketone, as well as esters, ethers, hydrocarbons and the like. As will be noted in the experimental section hereinbelow, aqueous based emulsions may also be used with advantage to prepare the coated substrates of the present invention.

Polymerization Initiators

As is known to those of skill in the art, polymerization of acrylate monomers may be initiated by a variety of mechanisms. In many instances, radiant energy, in the form of ultraviolet energy will be sufficient to initiate the polymerization process. Polymerization may be initiated by the incorporation of photosensitizers and/or photoinitiators into the monomer solution. Among some of the preferred photoinitiators is a product sold under the designation KBI by the Sartomer Corporation, and generally comprised of benzyl dimethyl ketal (BDK). Other photoinitiators which are commonly used in radiation curing formulations which are comprised of different derivatives of benzophenone and other keto aromatic compounds are of similar utility provided they dissolve to a sufficient level int eh carrier solvent and in the monomer mixture after the removal of the carrier solvent. A few such compounds are sold under the trade names Irgacure 184 (Ciba Geiby) and Carocur 1173 (Merck).

As is known to those of skill in the art, oxygen can interfere with many polymerization processes. It has been found in accord with the present invention that polymerization is preferably carried out in an atmosphere which includes less than 200 ppm of oxygen. Oxygen levels higher than 200 ppm have been found to raise the surface energy of the polymer. This effect is believed to be due to the formation of peroxy radicals which eventually lead to the surface inhibition effect and to the formation of polar oxygenated groups at the surface.

Polymerization of fluoroacrylate monomers may also be initiated by bombarding the monomer with an electron beam, in which case an initiator compound need not be present in the mixture. In other instances, polymerization may be via a thermal initiation route. If free radical polymerization is to be employed, an initiator such as benzoyl peroxide is added to the mixture. Typically, the initiator is activated by heating so as to release free radicals which begin the polymerization process.

Cross-linkers

In some instances it is also desirable to include a cross-linking reagent in the monomer solution. The cross-linking reagents, as well known to those of skill in the art, further react to cross-link the polymer chain at various points and thereby further decrease its solvent solubility and enhance its mechanical bond to the substrate. There are a wide variety of cross-linking agents for acrylate type polymers known to those of skill in the art. One particularly preferred group of cross-linking agents comprises the acrylates, particularly mono-di-tri- and poly-acrylates which are compatible (i.e. at least partly soluble) with the fluoroacrylate monomer in the particular carrier solvent solution Polyacrylamides also have significant utility as cross-linkers. Preferably the cross-linking agent should also be soluble in the fluoromonomer after the evaporation of the carrier solvent. For example, trimethylolpropanetriacrylate (TMPTA) or hexanedioldiacrylate (HDDA) may be advantageous used as cross-linking agents. Cross-linking agents are typically included in the solution in the range of 0-80% of the monomer mixture and most preferably in the range of 5-30% of the fluoroacrylate monomer.

While the foregoing has described solutions of monomers and appropriate initiators and cross-linking agents, and the like, it is to be understood that a strict solution of the reagents need not be achieved. In some instances, an emulsion or partial solution of the materials may be used with advantage to treat a porous substrate.

The Substrate

Any porous substrate may be used in conjunction with the treatment of the present invention. Microporous membranes represent one particularly preferred group of substrates. Generally, microporous membranes are characterized by having a structure that includes various size pores ranging from 0.01 to 10 microns in size. One particularly preferred material is the Sunbeam Process ™ material of Gelman Sciences Inc., which is disclosed in U.S. Pat. No. 4,466,931, the disclosure of which is incorporated herein by reference. Another membrane is the acrylate microporous membrane sold by Gelman Sciences, Inc., under the Versapor ® designation. Still another type of microporous substrate is a porous polytetrafluoroethylene membrane manufactured by W. L. Gore and Associates. Pore sizes of these particular membranes typically range from 0.02 to 3.0 microns. Other membranes which may employed in conjunction with the present invention are polyamide, PVDF, polyolefin and polyurethane microporous membrane such as those sold by Millipore, Pall, F. M. Cuno, 3M and others. Other substrates include woven and non-woven fabrics, paper, leather or any other such material. Additionally, it is to be noted that the coatings of the present invention are not restricted to use on strictly porous materials; but rather, they may be applied to any surface which is to be rendered non-wettable. For example, the coatings may be applied to glass, plastics, wood, ceramic and the like.

Coating Techniques

As mentioned previously, a variety of coating techniques may be employed to deposit the monomer mixture upon the porous substrate. Dip coating may be employed in which a substrate, preferably in web form, is advanced by a series of rollers through a bath of the monomer mixture. The impregnated membrane is then pulled across a drying roller or conveyed through a drying tunnel which evaporates the carrier solvent, preferably for recovery. In other instances, the technique of bead coating is employed wherein a roller disposed in a bath of solution carries a film up into contact with a substrate which is subsequently carrier to a drying roller or drying tunnel. Bead coating has the advantages of allowing for careful control of the amount of coating mixture applied to the substrate thereby eliminating waste and allowing for precise control of coating thickness. Other methods such as spraying and the like may be similarly employed.

Drying has been found to be quite important if best results are to be achieved. If the coated substrate is still wet by solvent when polymerization is initiated, final properties of the product are detrimentally affected supposedly by formation of deviant polymer morphologies and/or as a result of poor adhesion of the polymerized material to the substrate. It has been found that overdrying can also lead to inferior results which are also due to partial evaporation of some components of the monomer solution. The particular drying conditions will depend upon the nature of the solvent, the nature of the substrate and the thickness and porosity of the substrate.

TABLE 1

| Sample No. | Hexane 18.4 | Heptane 20.3 | Kerosene 27 | Sliding Angle | Air Flow | % Monomer | Monomer |
|---|---|---|---|---|---|---|---|
| 1 | + | − | − | 49 | 290 | 1 | A |
| 2 | − | − | − | 49.5 | 209 | 2 | A |
| 3 | +/− | − | − | 65 | 334 | 1 | B |
| 4 | − | − | − | 58.5 | 248 | 2 | B |
| 5 | + | + | + | >90 | 225 | 1 | C |
| 6 | + | + | +/− | 80.9 | 399 | 2 | C |
| 7 | + | +/− | − | 65 | 239 | 1 | D |
| 8 | +/− | − | − | 58 | 177 | 2 | D |
| 9 | + | + | + | >90 | 355 | 1 | E |
| 10 | + | + | +/− | 84 | 345 | 2 | E |
| 11 | + | + | + | >90 | 237 | 1 | F |
| 12 | + | + | +/− | 83 | 264 | 2 | F |
| 13 | + | + | + | 83 | 209 | 1 | F |
| 14 | + | + | + | 82.5 | 164 | 2 | F |
| 15* | + | + | − | NA | 460 | 2 | G |
| 16 | + | + | + | >90 | 800 | none | none |
| 17 | + | + | + | 30 | 2000 | none | none |

*Wetted by isopropanol but not wetted by methanol (surface tension 22.6 dyne/cm)

TABLE 1A

| Monomer | Formula | % N Value in Mixture | | | |
|---|---|---|---|---|---|
| | | 6 | 8 | 10 | 12+ |
| A | $(C_nF_{2n+1})-CH_2-CH_2-OCOCH=CH_2$ | 0.7 | 52 | 32 | 13 |
| B | $(C_nF_{2n+1})-CH_2-CH_2-OCOCH=CH_2$ | <2.5 | 95-100 | <2.5 | — |
| C | $(C_nF_{2n+1})-CH_2-CH_2-OCOCH=CH_2$ | 95 | <5 | — | — |
| D | $(C_nF_{2n-1})-CH_2-CH_2-OCOCH=CH_2$ | 45 | 31 | 13 | 8 |
| E | $C_7F_{15}CH_2OCOCH=CH_2$ | | | | |
| F | $C_6F_{13}CH_2CHOCOCH=CH_2$ $CH_2OCOCH=CH_2$ | | | | |
| G | $C_8F_{17}SO_2N(C_2H_5)CH_2CH_2OCOCH=CH_2$ | | | | |

TABLE 1-B

| SOLVENTS | SOLVENT REPELLENCY | |
|---|---|---|
| | SURFACE TENSION | WETTING |
| Hexane | 18.43 | − |
| Heptane | 20.30 | − |
| Xylene | 30.10 | − |
| Methylenechloride | 26.52 | − |
| Chloroform | 27.14 | − |
| Carbon tetra chloride | 26.95 | − |
| Perchloro ethylene | 32.3 | − |
| Trichloro ethylene | 29.5 | − |
| Tetrahydrofuran | 26.4 | − |
| Ether | 17.01 | + |
| Acetone | 23.70 | − |
| Diiso butyl keton | | − |
| Isopropanol | 21.7 | − |
| Methanol | 22.61 | − |
| Methyl carbitol | 34.4 | − |
| Butylacetate | 25-28 | − |
| Diisopropyl adipate | 31.5 | − |
| Diisobutyl adipate | 33.4 | − |
| Butyl cellusolve acetate | 30.3 | − |
| Dibutyl phthalate | 33.4 | − |
| Dimethylformamide | 37 | − |
| Freon ® | 17.75 | + |
| Florinert ® FC75 (3M) | 15.1 | + |
| Methyl ethyl ketone | 24.6 | − |
| Dimethylpolysilioxane | 20.1 | − |
| Kerosene | 36.1 | − |

Experimental Results

There are a great variety of applications for coated membranes which are hydrophobic and oleophobic. Generally, such membranes must have three characteristics: (1) good air permeability, (2) ability to withstand a fluid pressure over a long period of time and (3) rapid drainage of fluid from the surface so as to maintain air permeability.

One example of an application for such membranes is a microporous vent for use in an intravenous line. The vent is typically made of a 0.02 micron hydrophobic, microporous membrane which is exposed in use, to a low surface tension aqueous multi-vitamin solution for long periods of time. Most hydrophobic membranes used under such conditions do not maintain the three characteristics described above. For example, it has been found that a UV cured membrane of the type described in European Patent No. 216,622 containing 9 to 17% of UV cured fluoroacrylate monomer of the formula: $C_8F_{17}SO_2N(C_2H_5)C_2H_4OCOCH=CH_2$ is highly hydrophobic when tested for water breakthrough pressure; however, when wetted by multi-vitamin solutions for several hours it did not drain completely and left a thin water layer over the porous surface. This thin water layer prevented the membrane from transferring air. It is believed that the fluorocarbon groups on the surface of the membrane pores are mobile enough due to the flexible polyurethane structure to which they are linked such that they can get buried inside the polymer structure when it is exposed for a long period of time to aqueous solutions. As a result, the water "sticks" to the polymer at the points at which there is physical contact between water and the polymer. The inner pore surface which is not in direct contact with water remains hydrophobic. Hence, the drainage of aqueous solution from the surface of the membrane is impaired even though the water breakthrough pressure of the membrane is not affected. Treatment of this same membrane with a silicone compound or with a fluorinated polymer sold under the trade name Scotchguard ® 326 improved the characteristics of the membrane; but, this improvement decreased over time with continued exposure to the multivitamin solution, supposedly from washing away of the treatment or from similar segmental movement which buries the fluoro group away from the solution. Substitution of a highly hydrophobic PTFE fluoropolymer membrane in this particular intravenous application required that the pore size of the membrane be reduced to 0.02 microns to provide adequate repellency to the solution; however, the small pore size of this membrane resulted in low air permeability.

The wettability of a particularly treated membrane will be a function of the size of the pores of the membrane, the nature of the surface of the membrane and the nature of the liquid used to wet the membrane. As shown by the breakthrough pressure equation, the contact angle of a drop of liquid with a non-porous surface has to be above 90° to allow for non-wettability.

Wettability, Tables 1,1A and 1B

The wettability of membranes treated with different fluoroacrylate monomers was assessed by coating a number of samples of hydrophobic membrane having a nominal pore size of 0.1 microns (Gelman Sciences Sunbeam Process TM Membrane), with different fluoroacrylate monomers and subsequently assessing the wettability, sliding angle and airflow of the final product. Data from the experimental series is summarized in table 1.

Wettability was determined visually by noting if a liquid deposited upon the membrane was imbibed into it within a few seconds or was kept at the surface. A + designation indicates that the material is wetted by a given solvent whereas a − indicates that it is not. The experimental series was carried out with the solvents shown in the table, which also lists the values of the surface tension of the various solvents in dynes per centimeter. Sample 15 was also tested with isopropyl alcohol (21.7 dyne/cm) and methanol (22.6 dyne/cm). The sliding angle is defined within the context of this table as the angle at which a 50 micro liter drop of water begins to slide across a membrane surface. Airflow was measured by applying a pressure equivalent to an 80 centimeter head of water to a 5 square centimeter portion of membrane and the amount of air in milliliters per minute flowing therethough was measured.

Table 1A depicts the monomers used to coat the various membrane samples of Table 1A. All of the solutions represented in the coated membranes of Table 1 used the fluoro monomer together with a HDDA cross-linker in a ratio of 4 to 1 except samples 13 and 14 which contain no cross-linker. Samples 1-16 also contain 5 pph (based upon the monomer content of the formulation) of benzyl dimethyl ketal photoinitiator. Sample 16 was an untreated membrane and sample 17 was a microporous PTFE membrane having a 0.2 micron pore size. In all instances, the monomer was applied as a 1 or 2% solution in Freon ® 113.

It will be noted that samples 1 and 2, corresponding to a monomer primarily comprised of homologues having an n value equal to 8, 10 or 12 (average n approximately a), gave excellent results. The membrane was generally not wetted by solvents and manifested a sliding angle for water of approximately 50°, compared to a sliding angle of greater than 90° for the untreated membrane of sample 16. Additionally, airflow through the membrane is maintained at an acceptable rate. Samples 3 and 4, which correspond to a fluoroacrylate monomer having almost purely the C8 homologue was almost as good as the material used for samples 1 and 2 in terms of non-wetting and sliding angle. Samples 5 and 6 employ a monomer consisting almost totally of C6 homologues and performance is significantly degraded. These membranes are not very oleophobic and they manifest a high sliding angle. Samples 7 and 8 are derived from a monomer mixture having approximately 45% of C6 material and 55% of higher homologues. Performance is improved somewhat. The samples are not wetted by heptane and kerosene although sliding angles will remain fairly high. Samples 9 and 10 were treated with a somewhat different monomer with a fluorocarbon chain length of C7, and generally manifested poor performance.

Samples 11 to 14 relate to other C6 fluoroacrylate materials of the diacrylate type and as will be noted, their performance was similar to the monoacrylate with the C6 perfluoro group. Sample 15 depicts the results obtained from using a fluoroacrylate monomer. This membrane is also wetted by isopropyl alcohol and is not wetted by methanol. The sliding angle was not measured although airflow is fairly high.

Table 1-B presents further wettability data for a typical coated material of the present invention, namely sample 2 or Table 1. Table 1-B summarizes experimental data for a wide range of solvents having a variety of surface tensions. It is clear that the present invention renders the substrate non-wettable by solvents having surface tensions of 18 or more.

The conclusion from the data of Tables 1, 1-A and 1-B is that superior non-wettability by solvents having surface tensions as low as 18 dynes/cm is obtained by coating membranes with the fluoroacrylate monomers of the type described hereinabove.

Enhanced Washability Table 2

One of the most significant findings in connection with the present invention is the fact that the process provides greatly enhanced washability, presumably by the mechanical affixation of the coating to the porous substrate. Substrates coated according to the present invention may be dry cleaned, washed with detergents or exposed to oils or greases without any loss of their water and oil repellency characteristics. This is in significant differentiation from prior art coatings and methods in which monomers are prepolymerized and subsequently applied to a substrate.

A series of experiments was carried out in which various substrates were coated by in situ polymerization and by solution coating of a prepolymerized material The data are summarized in table 2. The properties of the coated substrates were measured both prior to and after solvent washing. Two different substrates were utilized in this experimental series. The first substrate was a Sunbeam Process TM hydrophobic membrane having 0.1 micron pores and is designated "S" in the table. The second membrane was an acrylic membrane having 0.2 micron pores sold under the trade name Versapor ® 200 by Gelman Sciences Corporation and is designated "V" in the table. Both membranes were coated with the polymer derived from the fluoroacrylate monomer designated "A" in Table 1A.

In the case of the in situ polymerization, the monomer was dissolved in a Freon ® 113 solution at approximately 2%. A photoinitiator (BDK) at a level of 5PPH (based on monomer) was added. The solution was utilized to impregnate the membranes; the membranes were dried and allowed to cure by passing them twice, in a nitrogen atmosphere (having 10-100 ppm oxygen) under a single 200 watt/inch medium pressure mercury lamp (Hanovia) at 10 m/min belt speed. The U.V. lamp was equipped with a parabolic reflector with the sample moving at approximately the focal zone of the radiation.

In the case of the prepolymerized material, a polymer solution was prepared by irradiation of 30% of the monomer in Freon 110 in the presence of 0.3 PPH photoinitiator ("BDK"). The solutions were sealed in glass vials after purging with nitrogen and polymerization was accomplished by exposure of the vials to a 200 watt/inch mercury lamp at an off focus position 17-25 centimeters away from the focal zone of the lamp. The irradiation was carried out for 12-30 minutes and resulted in a very viscous solution. Conversion was determined by gas chromatography to be 97-98%. The prepolymerized material was dissolved in Freon 113 at the listed concentrations of approximately 1 or 2%. Air flow and solvent wetting of the thus prepared samples was measured before and after solvent Freon ® 113 washing.

polymer in solution is unexpected and highly advantageous.

Electron Beam Curing

At noted hereinabove, the monomers may be polymerized onto the substrate by a variety of techniques such as ultraviolet curing and free radical initiated curing as has been discussed and described hereinabove. Curing may also be accomplished by electron beam bombardment. In this example, a 0.1 micron pore size hydrophobic Sunbeam Process ™ membrane was dipped into a Freon ® 113 solution containing a 2% mixture of monomer D of Table 1-A together with trimethylolpropanetriacrylate (TMPTA) cross-linker in an 80-20 weight ratio. The coated membrane was dried and subjected to an electron beam irradiation of two Mrad (electron curtain, Energy Sciences, Woburn, Mass.) under a nitrogen atmosphere containing less than 500 PPM oxygen.

A 5 $cm_2$ disk of thus coated membrane had an air flow of 400 ml/min at an 80 cm hydrostatic pressure. This compares with a flow rate of 850 ml/min for the same

TABLE 2

| Sample | Substrate | Monomer Mixture | Polymerization Method | % Solids | Freon Wash | Air Flow | Wetting | | | | |
|---|---|---|---|---|---|---|---|---|---|---|---|
| | | | | | | | Hexane | Heptane | Decane | Xylene | Kerosene |
| 1 | S | None | NA | NA | — | 750 ± 60 | + | + | + | + | + |
| 2 | S | Poly-A | Solution | 1 | — | 270 ± 60 | + | + | + | + | — |
| 3 | S | Poly-A | Solution | 2 | — | 110 ± 30 | + | + | + | +/− | — |
| 4 | S | Poly-A | Solution | 2 | + | 830 ± 30 | + | + | + | + | + |
| 5 | S | A | Insitu | 2 | + | 500 | — | — | — | — | — |
| 6 | V | None | NA | NA | — | 1070 ± 20 | + | + | + | + | + |
| 7 | V | Poly-A | Solution | 1 | — | 364 ± 4 | + | + | + | + | +/− |
| 8 | V | Poly-A | Solution | 2 | — | 130 ± 40 | + | + | + | + | — |
| 9 | V | Poly-A | Solution | 2 | + | 1035 ± 20 | + | + | + | + | + |
| 10 | V | A | Insitu | 1 | — | 760 ± 30 | — | — | — | — | — |
| 11 | V | A | Insitu | 1 | + | 833 ± 24 | + | + | — | — | — |
| 12 | V | A | Insitu | 2 | — | 215 ± 13 | — | — | — | — | — |
| 13 | V | A | Insitu | 2 | + | 342 ± 25 | + | + | — | — | — |
| 14 | V | A/HDDA (80/20) | Insitu | 1 | — | 700 ± 40 | — | — | — | — | — |
| 15 | V | A/HDDA (80/20) | Insitu | 1 | + | 785 ± 20 | — | — | — | — | — |
| 16 | V | A/HDDA (80/20) | Insitu | 2 | — | 550 ± 70 | — | — | — | — | — |
| 17 | V | A/HDDA (80/20) | Insitu | 2 | + | 640 ± 60 | — | — | — | — | — |

Referring now to Table 2, it will be seen that the prepolymerized material (e.g. samples 2-4, 7-9) produced membranes having much poorer wetting characteristics and airflow characteristics than did the in situ polymerized material. (Samples 5, 10-17.) Also, the treatment with the prepolymerized material is not permanent. As will be noted from the table, subjecting the coated membranes to a post coating wash with Freon ® significantly degrades the properties of the membranes coated with the solution of polymerized material but does not degrade the properties of the membrane coated with the in situ polymerized material. This finding is particularly surprising and counterintuitive in view of the fact that the Freon ® is a good solvent for the polymerized material. It is speculated that the mechanical affixation of the in situ polymerized material to the porous structure of the membrane protects it from removal by the solvent. The fact that the in situ polymerized monomer performs so much better than the same membrane when untreated. The untreated membrane exhibited no air flow after exposure for a few seconds to a multivitamin solution or to plain water. The treated membrane showed no drop in air flow after being exposed to either solution for periods of up to 20 hours. The air flow of the wet membrane was measured by taking a membrane whose smooth surface was kept in contact with a solution, draining the membrane vertically for a few seconds, and then measuring the air flow under a pressure equivalent to 80 cm of water with the pressure being applied to the horizontal wet surface.

Effects of Cross-linkers Tables 3,4

It has been found that a cross-linking material may be included along with the fluoroacrylate monomer. The cross-linkers comprise co-monomers which are capable of cross-linking the monomer either concomitant with polymerization thereof or in a post polymerization step. One particularly preferred group of cross-linking agents are the di, tri or polyacrylates.

TABLE 3

| Sample | Treatment Solution Solids Ratio | | | Air Flow | Wetting (Surface Tension dynes/cm) | | | | | |
|---|---|---|---|---|---|---|---|---|---|---|
| | Monomer A | HDDA | BDK | | $C_6$ 18.4 | $C_7$ 20.3 | $C_8$ 21.8 | $C_{10}$ 23.5 | IPA 21.7 | K 27.6 |
| 1 | 100 | 0 | 5 | 500 | − | − | − | − | − | − |
| 2 | 80 | 20 | 5 | 540 | − | − | − | − | − | − |
| 3 | 50 | 50 | 5 | 615 | + | − | − | − | − | − |
| 4 | 50 | 50 | 2 | 645 | + | − | − | − | − | − |
| 5 | 37.5 | 62.5 | 5 | 695 | + | +/− | +/− | − | − | − |
| 6 | 25 | 75 | 5 | 735 | + | +/− | +/− | − | − | − |
| 7 | 0 | 0 | 0 | 900 | + | + | + | + | + | + |

TABLE 4

| Sample | Monomer A | HDDA | SR257 | C2000 | BDK | Air Flow | Wetting | | | | | |
|---|---|---|---|---|---|---|---|---|---|---|---|---|
| | | | | | | | $C_6$ | $C_7$ | $C_8$ | $C_{10}$ | $C_{12}$ | IPA | K |
| 1 | — | — | — | — | — | 900 | + | + | + | + | + | + | + |
| 2 | 37.5 | 62.5 | — | — | 5 | 720 | + | +/− | +/− | − | − | − | − |
| 3 | 37.5 | 50 | 12.5 | — | 5 | 715 | + | +/− | +/− | − | − | − | − |
| 4 | 37.5 | — | — | 62.5 | 5 | 645 | + | +/− | +/− | − | − | − | − |
| 5 | 37.5 | — | 62.5 | — | 5 | | + | + | + | +/− | − | − | − |

Table 3, summarizes the results of an experimental series wherein varying amounts of a cross-linker were added to a monomer polymerized in situ on a membrane. The membrane of the Table 3 experimental series was a Sunbeam Process TM 0.1 micron pore membrane and it was treated with a 2% mixture of the listed solids in a Freon ® 113 solvent. Curing was as for the previous example. After coating and curing, each of the samples was subjected to a Freon ® wash and air flow and solvent wetting were measured as above. In Table 3 and Table 4 the symbols "$C_6$-$C_{12}$" indicate the corresponding hydrocarbons from hexane to dodecane. The symbol "IPA" refers to isopropyl alcohol and "K" signifies kerosene.

The cross-linker employed in this instance was hexanediol diacrylate (HDDA). It will be noted from the table that inclusion of up to 50% diacrylate cross-linker improved the airflow characteristics of the coated membrane without significantly affecting the solvent repellency characteristics thereof. It has been found in general that a range of 0 to 50% of HDDA cross-linker is optimal. It is particularly advantageous to include the cross-linker itself is much cheaper than the fluoroacrylate monomer. In general, it has been found that up to 80% of the monomer may be replaced by the cross-linker. It has also been found that other di, tri and polyacrylates can be used in a similar manner.

Other reactive comonomers and oligomers can also be similarly incorporated into the system. For example, monoacrylic esters or acrylamides which are compatible with the fluoro monomer may be employed. Octadecylacrylate sold by the Sartomar Corporation under the designation SR257 is another monomer having utility in the present invention as is a long chain $C_{14}$-$C_{15}$ diacrylate sole by the Sartomar Corporation under the trade name Chemlink 2000. Table 4 summarizes data for these compounds. In general it is desirable that any cross-linking agent utilized be soluble with the fluoro monomer; however, complete compatibility is not essential. TMPTA is not fully compatible with monomer A yet has been found to provide a membrane with good solvent repellency.

Solvents

While most of the following results have been derived from coatings based on clear Freon ® solutions of the reactants, it has been found that a variety of solvents may be employed provided they are capable of solvating the reactants and being readily evaporated.

Moreover, true solutions are not a prerequisite for using this technology. In some cases, less polluting aqueous coating solutions may be used. In has been found that emulsions may be employed. For instance, a coating was prepared from an aqueous emulsion by the following steps. A concentrated emulsion was made by stirring a mixture of 40 parts of: monomer A, HDDA, BDK photoinitiator and Freon ® 113 in a 90/10/5/26.25 weight ratio into a mixture of 3.15 parts of hydroxy propylcellulose (KLUCEL EF), 2.2 parts of surfactant (Tetronic 707, BASF) and 59.85 parts water. The emulsion was diluted with a further addition of water to 2% active monomers and applied to a Sunbeam Process TM membrane by dipping. The membrane was allowed to dry at room temperature for 30 minutes prior to radiation curing. The curing was accomplished as described hereinabove and it was found that the membrane, after washing with Freon ®, had an airflow of 560 ml/min at 80 centimeters of water, for a 5 cm² sample. This compares with an air flow of 1110 ml/min for the original membrane. The coated membrane was not wetable by xylene and kerosene.

Substrates—Table 5

As mentioned previously, the present invention may be practiced in combination with a variety of substrates. Table 5 details an experimental series wherein one of the coatings of the present invention was applied to a group of substrate materials and properties of the resultant coated materials were measured. The substrates generally comprised microporous membranes, paper, woven fabric and non-woven fabric.

Sample 1 comprised a hydrophilic Sunbeam Process TM membrane composed of a copolymer of acrylated polyurethane resin and acrylic monomers whereas sample 11 comprised a hydrophobic Sunbeam Process TM membrane available from Gelman Sciences Inc. and designated IVVB200 and which is similar to those employed in the previous examples. Membrane sample 2 was a polytetrafluoroethylene membrane available from Gelman Sciences Inc. under the designation TF200. Samples 3 and 4 were polyvinylidene fluoride membranes. Samples 5, 6 and 7 were poly(ethersulfone) membranes sold by Gelman Sciences Inc. under the trade name Supor; the material of sample 5 was designated Grade C200, that of sample 6 was 450 and that of sample 7 was 50. Membrane 8 was a commercial grade polyamide (nylon) membrane sold by Gelman Sciences under the trade name Nylyflo. Samples 9 and 10 were acrylic membranes of the type sold by Gelman Sciences under the designation Versapor ® 200 and 3000, respectively. The material of sample 12 comprised photocopying grade paper. That of sample 13 comprised woven nylon taffeta fabric and that of sample 14 comprised a non-woven spun-bonded polyester material of 2.0 oz./sq. yd. sold under the trade name Hollytex 3254 by the Eaton-Dikeman Corporation.

The samples of Table 5 were each coated with a mixture of the type A monomer of Table 2 together with an HDDA cross-linker and a benzyl dimethyl ketal (BDK) photocuring agent in an 80/20/5 weight proportion. The mixture was dissolved in Freon ® 113 solvent at the concentrations noted. Coating and curing was as for the previous examples.

Porosity of the membrane was measured by a Freon ® bubble point method wherein one face of a membrane was exposed to a volume of Freon ® 113 while the other face thereof was pressurized with air. The pressure, in bars, required to force air bubbles through the membrane and into the Freon ® was measured. In general it will be noted that the treatment of the present invention had little, if any, effect upon the bubble point. Airflow was measured as in the previous examples. The water breakthrough value for various of the coated membranes was determined by noting the pressure in bars which was required to force water through the coated membrane.

Wetting characteristics of the coated membranes and the other coated substrates were measured as previously described and it will be noted that the treatment of the present invention was quite effective in rendering all of the materials of different morphology (porous, knitted, woven, non-woven, etc.) and all of the polymers of different compositions non-wettable by a large variety of solvents. All tested materials were non-wetted by solvents having surface tensions as low as 23 dynes/cm and most of the treated materials were non-wetted by solvents with surface tensions as low as 18–20 dynes/cm.

TABLE 5

| Sample | Material | Pore Size M | Solids | Bubble Point Original/Treated | | Air Flow Original/Treated | |
|---|---|---|---|---|---|---|---|
| 1 | Hydrophilic Acrylic/urethane | 0.1 | 2 | 1.7 | 1.6 | 1082 | 740 |
| 2 | PTFE | 0.2 | 2 | 1.1 | 1.0 | 2165 | 1879 |
| 3 | PVDF | 0.2 | 2 | 1.1 | 1.1 | 532 | 512 |
| 4 | PVDF | 0.02 | 2 | ND | ND | 190 | 175 |
| 5 | Poly sulfone | 0.2 | 2 | 1.1 | 1.1 | 2137 | 2053 |
| 6 | Poly(ether-sulfone) | 0.45 | 2 | 0.92 | 0.82 | 2611 | 2380 |
| 7 | Poly(ether-sulfone) | 0.05 | 2 | 2.9 | 3.0 | 413 | 343 |
| 8 | Polyamide | 0.2 | 2 | 1.27 | 1.15 | 743 | 719 |
| 9 | Acrylic | 0.2 | 2 | 0.99 | 0.93 | 1100 | 970 |
| 10 | Acrylic | 3.0 | 0.5 | 0.120 | 0.115 | 23600 | 22000 |
| 11 | Hydrophobic Acrylic/urethane | 0.1 | 2 | 1.5 | 1.5 | 740 | 550 |
| 11a. | Hydrophobic Acrylic/urethane | 0.2 | 1 | 1.0 | 1.0 | 2500 | 2500 |
| 12 | Paper | | 2 | | | | |
| 13 | Woven Nylon | | 2 | | | | |
| 14 | Nonwoven Spun-bonded Polyester | | 2 | | | | |
| 15 | Fiberglass nonwoven | | 2 | | | | |

| Sample | Wetting | | | | | | | Water Break Through | Sliding Angle (25 ul) |
|---|---|---|---|---|---|---|---|---|---|
| | $C_6$ 18.4 | $C_7$ 20.3 | $C_8$ 21.8 | IPA 21.7 | $C_{10}$ 23.5 | MeOH 22.6 | K 27 | | |
| 1 | − | − | − | − | − | − | − | 5.1 | 18–35 |
| 2 | +/− | +/− | + | + | − | − | − | ND | 27–55 |
| 3 | + | + | + | + | − | − | − | ND | 28–37 |
| 4 | − | − | − | − | − | − | − | ND | 47–50 |
| 5 | + | + | − | +/− | − | − | − | 4.2 | 12–25 |
| 6 | − | − | − | − | − | − | − | 2.95 | 5–7 |
| 7 | − | − | − | − | − | − | − | ND | >90 |
| 8 | − | − | − | − | − | − | − | 3.0 | 40–42 |
| 9 | +/− | − | − | − | − | − | − | 3.7 | >90 |
| 10 | − | − | − | − | − | − | − | 0.426 | 0–10 |
| 11 | − | − | − | − | − | − | − | 5.3 | 65–75 |
| 11a. | + | +/− | − | − | − | − | − | 3.4 | 13–17 |
| 12 | − | − | − | − | − | − | | ND | |
| 13 | + | − | − | − | − | − | | ND | |
| 14 | + | + | +/− | +/− | − | − | | ND | |
| 15 | − | − | − | − | − | − | | | 17–22 |

It has thus been found in accord with the principles of the present invention that significant advantages in the coating of porous substrates are achieved by coating the substrates with a fluoroacrylate monomer, which is subsequently polymerized thereonto in situ. Polymerizing in this manner mechanically adheres the finished coating to the substrate to provide a conformal oil and water repellent coating. This coating is very resistant to solvent attack and provides a coated material having high permeability to gas flow and a significantly repellency to both water and oil.

It is to be understood that the foregoing discussion and examples are meant to detail particular features of the present invention. It is to be understood that the invention can be practiced with a variety of fluorinated monomers and the compositions as described herein may be further utilized in combination with various other cross-linkers, co-monomers, curing agents and the like. The coatings may be applied to a variety of natural and synthetic substrates and may, in some instances, confer significant advantages to non-porous substrates also, in those instances where it is desirable to increase the water and oil repellency of such materials. In such instances, the microtexture of the substrate itself will provide for significant mechanical adhesion and bonding of the coating thereon. Alternatively, the nonporous substrate may be prepared by etching, abrading or some such texturizing process.

In light of the foregoing, it will be understood that the aforementioned discussion, description and examples are merely illustrative of particular embodiments of the present invention and are not limitations upon the practice thereof. It is the following claims, including all equivalents which define the scope of the invention.

I claim:

1. A method for treating a porous substrate (10) to achieve permanent water and oil repellency while maintaining the porosity thereof, the method comprising the steps of:
   A) providing a fluoroacrylate monomer (16) of the formula $(C_nF_{2n+1})(CH_2)_x(CHR)$ OCOCH=CH$_2$, where: n is an integer, X is: 0, 1, 2 or 3 and R is: H or CH$_2$OCOCH=CH$_2$;
   B) disposing the monomer (16) in a carrier vehicle so as to form a mixture (14) thereof;
   C) impregnating the substrate (10) with the monomer mixture (14);
   d) removing substantially all of the vehicle from the substrate (10): and
   E) initiating polymerization of the monomer (16) after substantially all of the vehicle is removed from the substrate whereby the monomer (16) is polymerized to form a conformal, oil and water repellant coating (16') which is mechanically adhered to the substrate.

2. A method as in claim 1, wherein said monomer (16) comprises a number of homologues corresponding to different values of n and wherein at least 5% of said homologues have a value of n which is at least 8.

3. A method as in claim 2, wherein at least 30% of said homologues have a value of n which is at least 8.

4. A method as in claim 2 wherein at least 50% of said homologues have a value of n which is at least 8.

5. A method as in claim 1, including the further step of providing an initiator which is activatable to cause polymerization of the monomer (16) and wherein the step of disposing the monomer (16) in a carrier vehicle includes the further step of disposing the initiator in the vehicle and wherein the step of initiating polymerization of the monomer (16) comprises activating the initiator.

6. A method as in claim 5, wherein the step of providing an intiator comprises providing a photoinitiator and the step of activating the initiator comprises irradiating the photoinitiator with light.

7. A method as in claim 5, wherein the step of providing an intiator comprises providing a free radical initiator and wherein the step of activating the initiator comprises heating the initiator.

8. A method as in claim 1, wherein the step of initiating polymerization of the monomer (16) comprises bombarding the monomer with an electron beam.

9. A method as in claim 1, including the further step of providing a cross-linking reagent so as to provide a monomer mixture and the step of disposing the monomer (16) in a carrier vehicle includes the further step of disposing said monomer mixture in the carrier vehicle and the step of initiating polymerization of the monomer (16) includes the further step of activating the cross-linking reagent.

10. A method as in claim 9, wherein the step of providing a cross-linking reagent comprises providing a member selected from the group consisting essentially of: monoacrylates, diacrylates, triacrylates, polyacrylates, monoacrylamides and combinations thereof.

11. A method as in claim 1, wherein the step of disposing the monomer (16) in a carrier vehicle comprises disposing sufficient monomer in a carrier vehicle so that the substrate (10), when impregnated with the monomer mixture (14) will include approximately 0.1-10% by weight of monomer (16) thereupon.

12. A method as in claim 1, wherein the step of disposing the monomer (16) in a carrier vehicle comprises disposing the monomer (16) in a fluorocarbon vehicle.

13. A method as in claim 1, wherein the step of disposing the monomer (16) in a carrier vehicle comprises disposing the monomer (16) in a an aqueous emulsion of a non-aqueous solvent.

14. A method as in claim 9, wherein the step of providing a cross-linking reagent comprises providing an amount of cross-linking reagent which is equal by weight to up to 80% of said monomer mixture.

15. A method as in claim 9, wherein the step of providing a cross-linking reagent comprises providing an amount of cross-linking reagent which is equal by weight to up to 50% of said monomer mixture.

16. A method as in claim 1, wherein said substrate (10) is a polymeric substrate prepared from a polymer chosen from the group consisting essentially of: polytetrafluoroethylene, vinyl, polyamide, polyurethane, polyvinylidene fluoride, polypropylene, polyethylene, polysulfone, poly(ethersulfone) and combinations thereof.

17. A method as in claim 1, wherein said substrate (10) is prepared from a material chosen from the group consisting essentially of: woven fabric, knitted fabric, non-woven fabric, paper, leather and combinations thereof.

* * * * *